United States Patent [19]
Gehri

[11] Patent Number: 4,580,929
[45] Date of Patent: Apr. 8, 1986

[54] MACHINE TOOL WITH INTERCHANGEABLE INSERT-HOLDING CARTRIDGES

[75] Inventor: Hermann Gehri, Prangins, Switzerland

[73] Assignee: Stellram S.A., Nyon, Switzerland

[21] Appl. No.: 694,897

[22] Filed: Jan. 25, 1985

Related U.S. Application Data

[62] Division of Ser. No. 306,670, Sep. 29, 1981, abandoned.

[30] Foreign Application Priority Data

Oct. 9, 1980 [CH] Switzerland ............ 7537/80

[51] Int. Cl.⁴ .................... B26D 1/12; B26D 1/26
[52] U.S. Cl. ............................. 407/37; 407/49
[58] Field of Search ............. 407/37, 38, 39, 40, 407/41, 49

[56] References Cited

U.S. PATENT DOCUMENTS

| | | | |
|---|---|---|---|
| 1,376,972 | 4/1921 | Runde | 407/38 |
| 1,569,524 | 1/1926 | Noll . | |
| 1,778,260 | 10/1930 | Kearney . | |
| 1,938,773 | 12/1933 | Ernst et al. | 407/39 |
| 2,021,188 | 11/1935 | Lovejoy | 407/37 |
| 2,322,578 | 6/1943 | Kutscha | 407/38 |
| 2,367,221 | 1/1945 | Kraus | 407/39 |
| 2,385,750 | 9/1945 | Weddell | 407/41 |
| 2,415,136 | 2/1947 | Jerome | 407/40 |
| 2,584,449 | 2/1952 | Hoglund | 407/39 |
| 2,656,591 | 10/1953 | Billman | 407/38 |
| 2,903,784 | 8/1959 | Billman | 407/38 |
| 3,303,556 | 2/1967 | Pinkowski . | |
| 3,509,612 | 4/1970 | Lankin | 407/40 |
| 3,831,237 | 8/1974 | Gunsalus | 407/41 |
| 4,092,082 | 5/1978 | Severson | 407/40 |
| 4,303,113 | 12/1981 | Anderson | 407/49 |

FOREIGN PATENT DOCUMENTS

| | | |
|---|---|---|
| 1111368 | 7/1961 | Fed. Rep. of Germany . |
| 2491804 | 10/1980 | Fed. Rep. of Germany ........ 407/40 |
| 3013876 | 11/1980 | Fed. Rep. of Germany . |
| 1455182 | 6/1965 | France . |
| 1451933 | 11/1965 | France . |
| 2301346 | 2/1975 | France . |
| 119175 | 9/1918 | United Kingdom . |

Primary Examiner—Paul A. Bell
Assistant Examiner—Paul M. Heyrana, Sr.
Attorney, Agent, or Firm—Young & Thompson

[57] ABSTRACT

The invention relates to a machining tool, especially a milling-cutter, in which each insert-holding cartridge (1) is fixed in a removable manner in a housing made in the body (2) of the tool. A blocking element accessible from the outside cooperates with the body of the tool and bears in service position against an inclined plane (6) of the back side of the cartridge, so as the pressure toward the bottom and forward according to the arrow F blocks the cartridge in its housing on three bearings respectively situated on the bottom (3), the back side (4) and the front side (5) of this housing. The cartridge further laterally bears against a fixed or adjustable stop.

6 Claims, 22 Drawing Figures

MACHINE TOOL WITH INTERCHANGEABLE INSERT-HOLDING CARTRIDGES

This application is a division of application Ser. No. 306,670, filed Sept. 29, 1981, now abandoned.

The present invention relates to a machining tool with insert-holding cartridges removably fixed in housings made in the body of the tool. The term machining tool means here any kind of tools with brazed or removable cutting inserts for the machining by removal of chips, for example milling-cutters.

More particularly, the purpose of this invention is to provide a tool of the precited type which comprises a fixing system for the interchangeable insert-holding cartridges which allows an efficient blocking thereof within their respective housings, in such a manner that the machining stress is added to the clamping stress, and which is accessible in any position of the tool so as to make the change of cartridges easy.

The above purpose is achieved by the machining tool according to this invention, which comprises blocking means accessible from the outside and cooperating with the body of the tool and bearing upon an inclined plane of the back side of each cartridge, said back side being opposed to the front side carrying the cutting insert, in such a manner that the pressure downward and forward of said blocking means onto said inclined plane locks the cartridge in its housing on at least three bearings situated respectively on the bottom, the back side and the front side of said housing, and acts therefore on the cartridge in the same direction as the resultant of the cutting stresses.

The accompanying drawings show schematically and by way of examples several embodiments of the fixing device of a cartridge in a housing of the tool according to the invention.

FIGS. 8, 9 and 10 are cross-section views showing three possibilities for the fixed lateral bearing of the cartridge, whereas

As already mentioned, the accompanying drawings show only a portion of a tool, more particularly a cartridge with a brazed or removable cutting insert in service position in its corresponding housing provided within the body of said tool. This tool can be of any kind for machining by chips removal, for example a milling cutter.

Figure 1:
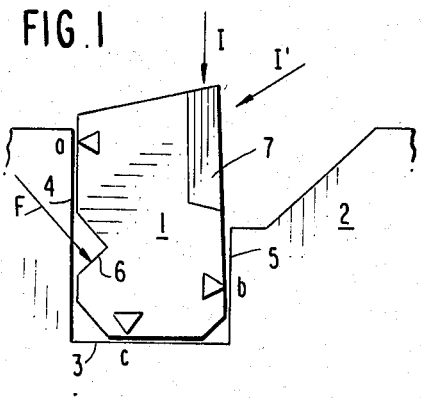
FIG. 1 is a cross-section view of a detail illustrating the working principle of the blocking on three points.

As illustrated in FIG. 1, the housing intended for receiving in a removable manner the cartridge 1 and driven in the body 2 of the tool has at least three sides, that is a bottom 3, a back side 4 and a front side 5. The cartridge 1, having a general shape in cross-section corresponding with that of the housing, has on its back side an inclined plane 6 on which a blocking element (not shown on FIG. 1) bears and which also cooperates with the body 2 of the tool and is oriented so that the pressure acts according to the arrow F toward the bottom 3 and forward. By this pushing action oriented according F, the cartridge 1, whose external dimensions are such that it can be introduced with clearance into the housing of the body 2, is subjected due to the orientation of said pressure to a slight pivoting motion which leads to a pinching effect and to the blocking of the cartridge on three bearings, in addition to the pushing point on its inclined plane 6. These three bearings are represented in cross-section by point a near the upper end of the back wall 4, point b near the lower end of the front wall 5 and point c situated on the bottom 3 of the housing. Each bearing is thus constituted here by a transverse line situated on the respective walls.

With the blocking as described above as to its general principle, the cutting stresses induced by the working tool (represented by arrows I and I') on the cutting insert 7, which is fixed on the front side of the cartridge, lead to increase the pressure of the cartridge in its housing on the same bearings, said cutting stresses being added to the blocking stress F. As it will be thereafter described, the cartridge is further laterally in abutment against a fixed or ajustable element.

Figure 2:
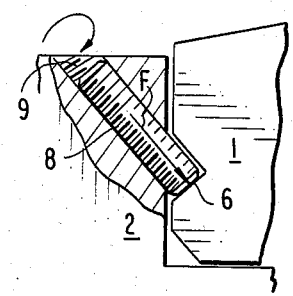
FIGS. 2, 3 and 4A are cross-section views of three variants of the fixing means.

As blocking element, a screw 8 (FIG. 2), or several screws according to the width of the cartridge 1, can be used which directly bears on the inclined plane 6 and cooperates with a thread 9 tapped in the body 2 of the tool according to the orientation of the stress F, the screw being thus accessible from the top of the body 2.

Figure 3:
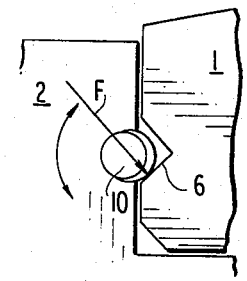
Figure 4A:
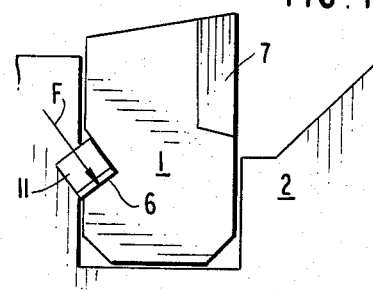
Figure 4B:
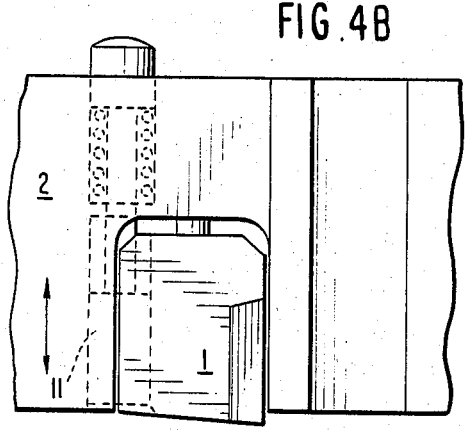
FIG. 4B is a view from above of the embodiment of FIG. 4A.

The blocking element can also be constituted by an eccentric 10 (FIG. 3) or by a conical key 11 (FIGS. 4A and 4B), these elements having their longitudinal axis perpendicular to that of the cartridge 1, but bearing on the inclined plane 6 thereof in the same manner as the screw 8, that is by exerting a pressure according to the arrow F, thereby to block said cartridge on three bearings in its housing. The eccentric 10 or the key 11 are thus accessible laterally of the tool.

Of course, the blocking element may be of other shapes and may act either directly on the inclined plane of the cartridge or through a ball, a cylinder, a wedge, etc.

Figure 5A:
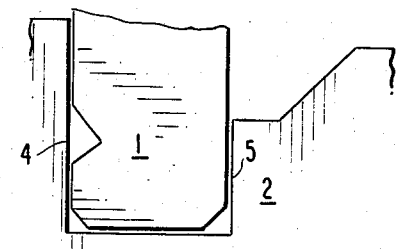
FIGS. 5A, 5B and 5C are cross-section views of three different embodiments of the removable cartridges and of the housings of the tool.
Figure 5B:
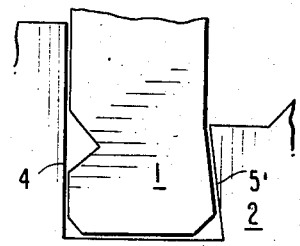
Figure 5C:
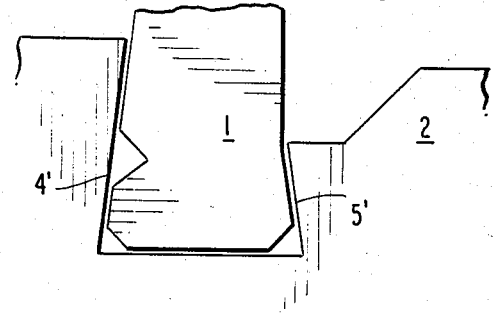

FIGS. 5A, 5B and 5C show three different examples of shapes of the front wall 5 and back wall 4 of housing in the body 2 of the tool and of the corresponding faces of the cartridge 1. Both walls 4, 5 can be parallel (FIG. 5A), or one of said walls 5' can be of conical shape (FIG. 5B), or further both walls 4', 5' can be of conical shapes (FIG. 5C).

Figure 6:
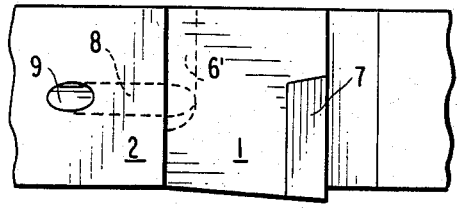
FIGS. 6 and 7 are cross-section views showing two variants of the inclined plane provided in the back side of the cartridge.

The inclined plane 6' on the back side of the cartridge 1 on which the blocking element bears can be opened on one side (lateral side) of the cartridge (FIG. 6), this allowing to release said cartridge by sliding by unlocking the screw 8 with a rotation of less than a quarter of turn. This embodiment is more particularly useful for example in the case of a milling cutter with a great number of teeth and where the interchangability of the cartridge is not easy.

Figure 7:
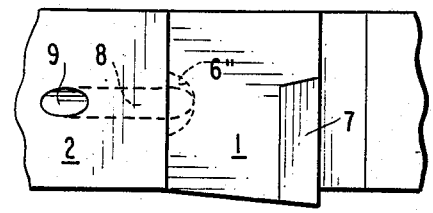

The inclined plane 6" can also be not opened (FIG. 7), this necessitating thus several turns of the screw for releasing the cartridge 1. This embodiment is thus usable in the cases where it is not necessary to change the cartridge 1 frequently.

The housing within the body of the tool and intended to receive the insert-holding cartridge can be opened at both ends and be thereby easier to machine, for example in the case of a disc-milling cutter or a removable crown surfacing milling cutter. The housing can be blind for example in the case of conventional surfacing milling cutters (monobloc).

Figure 8:
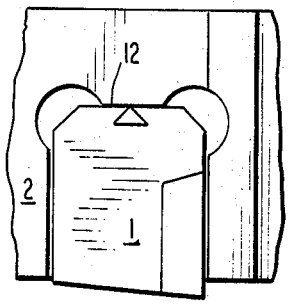
Figure 9:
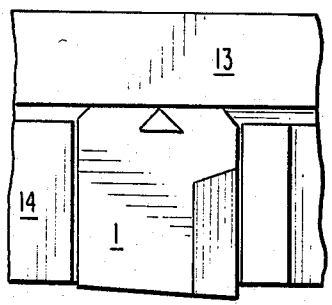
Figure 10:
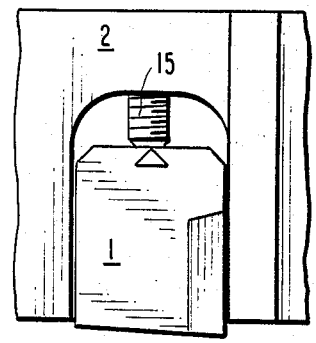

In their housing, the insert-holding cartridges have a lateral bearing which is either fixed or adjustable. In FIGS. 8 to 10 three variants are shown with fixed bearing respectively against the flank 12 of a non-traversing groove (FIG. 8), against the support 13 of a removable crown milling cutter 14 (FIG. 9) or against a built-up fixed element 15 (FIG. 10).

Figure 11:
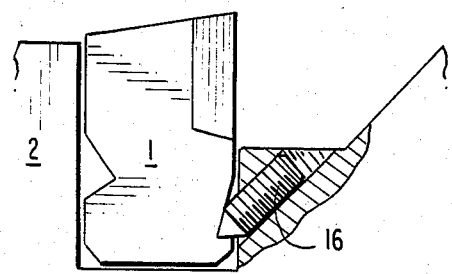
FIG. 11, 12, 13 and 14 are cross-section views showing four variants of the lateral bearing of the cartridge with adjustable stop.
Figure 12:
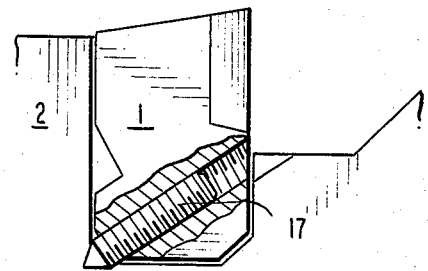
Figure 13:
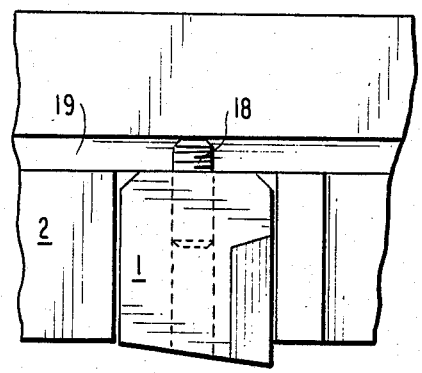

The cartridges can thus also be adjustable by means of a stop-screw accessible from the outside; this adjusting stop-screw can be disposed in the body of the tool (FIGS. 11 and 14) or in the cartridge itself (FIGS. 12 and 13).

The adjusting stop-screw can of course be of different shapes. For example a center punch-screw 16 situated in the body 2 of the tool and acting on the front side of the cartridge 1 presenting a conical recess offset from the axis of the screw (FIG. 11), or a centre punch-screw 17 traversing the cartridge 1 and also acting on a conical recess offset with regards to the axis of the screw and driven in the back side 4 of the housing of the body 2 of the tool (FIG. 12).

Figure 14:
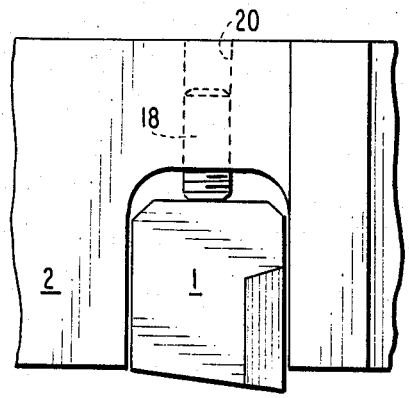

The adjustable stop screw can also be a screw 18 with a flat end laterally situated in the cartridge 1 (FIG. 13) and bearing against the side of a non-traversing groove 19, or against the support of a removable crown milling cutter or against any built-up element. A same screw 18 with flat end can also be introduced into a transverse screw-threaded bore 20 in the body 2 of the tool to bear against the lateral wall of the cartridge 1 (FIG. 14).

Figure 15:
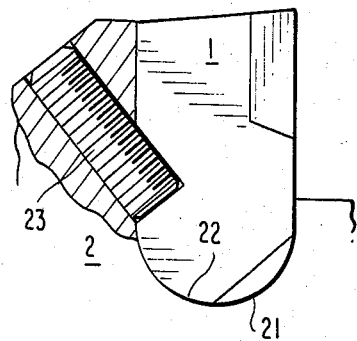
FIGS. 15 to 17 are cross-section views of three other embodiments of removable cartridges in their housing.
Figure 16:
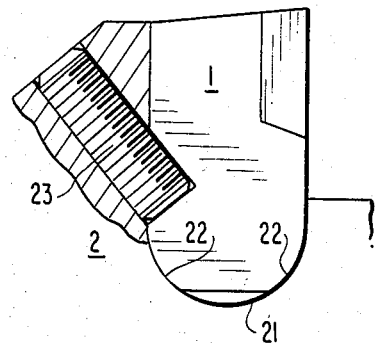
Figure 17:
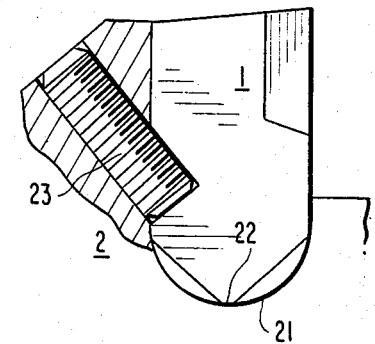

In the embodiments illustrated in FIGS. 15 to 17, the groove in the body 2 of the tool and serving as a housing for receiving the insert-holding cartridge 1 has a rounded bottom 21. The cartridge 1 also has at its lower end one (FIGS. 15 and 17) or two (FIG. 16) rounded portions 22 of a curvature corresponding to that of the bottom 21. The pivoting motion caused by the pressure exerted by the blocking element 23 is facilitated in these embodiments by the presence of the rounded surfaces. The blocking element 23 can of course be chosen especially from those described by reference to the preceeding embodiments.

Figure 18:
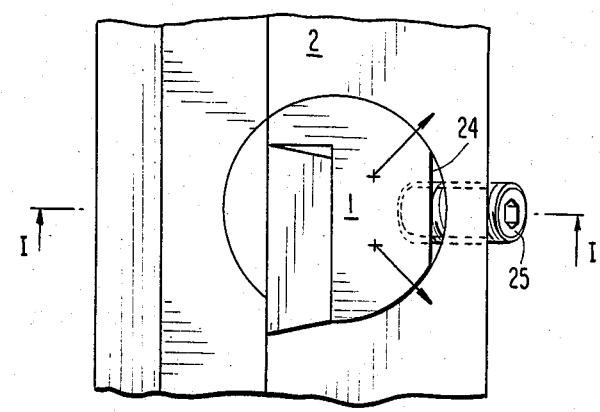
FIG. 18 is a view from above of an embodiment of the removable cartridge having a circular section and in its corresponding housing.
Figure 19:
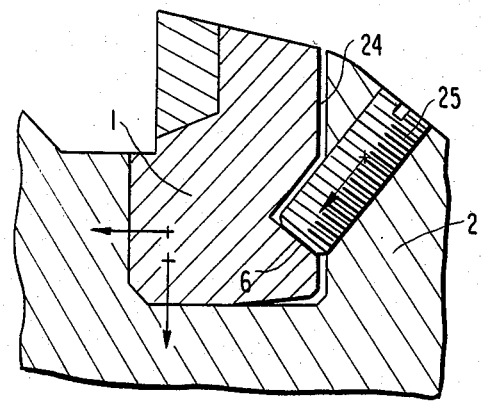
FIG. 19 is a cross-section view along the line I—I of FIG. 18.

Finally, in the embodiment shown in FIGS. 18 and 19, the insert-holding cartridge 1 and the housing in the body 2 of the tool have a circular section. Furthermore, the back side of the cartridge 1 has a longitudinal flat portion 24 in which the inclined plane 6 intended to receive the pressure of the blocking element 25 is made, and said element can also have any of the shapes already described. In this embodiment, the bearing of the back face of the cartridge against the wall of the housing is in fact divided into two bearings acting on each side of the flat portion 24, as shown by arrows in FIG. 18.

In all the embodiments, the adjusting stop-screw is always directly accessible from the outside of the tool, through a hole driven through the cartridge or through the body of the tool.

The fixing device of the insert-holding cartridges in the housings made in the body of the tool according to the invention has the following advantages:

the machining stress, for example the cutting stress, is added to the blocking stress, this allowing an efficient blocking on three bearing lines;

it is not cumbersome and therefore it is adaptable to tools of small sizes, it allows a high number of edges (reduced thread), it does not constitute an impediment to an optimal sizing of the chips chamber and it leaves a great choice of possibilities in combination with a stop system with fine adjusting accessible in any events;

the blocking element does not traverse the cartridge, this latter can be released without necessitating the complete removal of said element; according to this embodiment, the mounting or dismounting of the cartridges is very fast, a quarter of turn to the blocking element being sufficient;

the blocking element is always easily accessible from the outside of the tool and the change of cartridge is thus easy, even with a tool mounted on a machine;

it is adaptable to cutting tools, especially milling cutters, disc-milling cutters, surfacing milling cutters with a great number of teeth, any kind of particular multiedges tools, even single-edge, etc.

What I claim is:

1. A machine tool with a cartridge having front and back sides, said cartridge being removably fixed in a housing in the body of the tool, said housing having corresponding front and back sides and a bottom, which comprises blocking means accessible from the outside of said tool and cooperating with the body of the tool and bearing upon an inclined plane on the back side of the cartridge, said back side being opposed to the front side, said front side carrying a cutting insert, the front and back sides of said housing being integral with each other and the cartridge being disposed in the housing with clearance, whereby the pressure downward and forward of said blocking means on said inclined plane locks the cartridge in its housing on at least three bearings situated respectively on the bottom, the back side and the front side of said housing, and acts therefore on the cartridge in the same direction as the resultant of the cutting stresses, and an adjustable stop that acts between the cartridge and said housing along a line transverse to the line along which the blocking means exerts pressure.

2. A tool according to claim 1, in which the adjustable stop is a center punch screw traversing the cartridge and acting on a conical recess offset from the axis of the screw, said recess being situated in the backside of the housing.

3. A tool according to claim 1, in which the blocking means is a screw cooperating with screw threads within a hole in the body of the tool said screw exerting force on the cartridge in a direction toward the bottom of the housing and forward, and the lower end of said hole opening on the back side of the housing near the inclined plane of the cartridge disposed in this housing.

4. A tool according to claim 3, in which the inclined plane is situated on a middle portion of the back side of the cartridge.

5. A tool according to claim 1, in which the adjustable stop is a screw threaded within the hole that passes through the cartridge, one end of said screw bearing on said housing in a direction toward the back side and bottom of the housing, the other end of said screw being accessible from the outside of said tool.

6. A tool according to claim 5, in which the adjustable screw acts on a conical recess offset from the axis of the screw, said recess being situated in the backside of the housing.

* * * * *